United States Patent
Saunders et al.

(10) Patent No.: US 10,632,616 B1
(45) Date of Patent: *Apr. 28, 2020

(54) SMART ROBOT PART

(71) Applicant: Boston Dynamics, Inc., Waltham, MA (US)

(72) Inventors: John Aaron Saunders, Arlington, MA (US); Michael Patrick Murphy, Arlington, MA (US)

(73) Assignee: Boston Dymanics, Inc., Waltham, MA (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/670,404

(22) Filed: Aug. 7, 2017

Related U.S. Application Data

(63) Continuation of application No. 14/878,175, filed on Oct. 8, 2015, now Pat. No. 9,751,211.

(51) Int. Cl.
*B25J 9/16* (2006.01)

(52) U.S. Cl.
CPC ............ *B25J 9/1602* (2013.01); *Y10S 901/46* (2013.01); *Y10S 901/50* (2013.01)

(58) Field of Classification Search
CPC . B25J 9/16; B25J 9/169; Y10S 901/04; Y10S 901/50; G05B 2219/403; G05B 2219/331
See application file for complete search history.

(56) References Cited

U.S. PATENT DOCUMENTS

| 4,620,362 A | 11/1986 | Reynolds |
| 4,784,421 A | 11/1988 | Alvite |
| 5,550,953 A | 8/1996 | Seraji |
| 5,685,383 A | 11/1997 | Ferrante |
| 5,739,657 A * | 4/1998 | Takayama ............ G05D 1/0272 180/210 |

(Continued)

FOREIGN PATENT DOCUMENTS

| WO | 2014125360 A1 | 8/2014 |
| WO | 2015056178 A1 | 4/2015 |

OTHER PUBLICATIONS

Tchon "Repeatability of inverse kinematics algorithms for mobile manipulators", IEEE Transactions on Automatic Control (2002).

*Primary Examiner* — Stephen Holwerda
(74) *Attorney, Agent, or Firm* — Honigman LLP

(57) ABSTRACT

Example implementations may relate a robot part including a processor, at least one sensor, and an interface providing wireless connectivity. The processor may determine that the robot part is removablly connected to a particular robotic system and may responsively obtain identification information to identify the particular robotic system. While the robot part is removablly connected to the particular robotic system, the processor may (i) transmit, to an external computing system, sensor data that the processor received from the at least one sensor and (ii) receive, from the external computing system, environment information (e.g., representing characteristics of an environment in which the particular robotic system is operating) based on interpretation of the sensor data. And based on the identification information and the environment information, the processor may generate a command that causes the particular robotic system to carry out a task in the environment.

19 Claims, 13 Drawing Sheets

(56) References Cited

U.S. PATENT DOCUMENTS

| | | | |
|---|---|---|---|
| 6,349,245 B1 | 2/2002 | Finlay | |
| 6,408,226 B1* | 6/2002 | Byrne | G05D 1/0246 |
| | | | 318/568.11 |
| 6,938,938 B2 | 9/2005 | Risle | |
| 8,428,781 B2 | 4/2013 | Chang | |
| 8,516,918 B2 | 8/2013 | Jacobsen | |
| 2004/0128029 A1 | 7/2004 | Kato | |
| 2004/0148058 A1 | 7/2004 | Johannessen | |
| 2005/0065647 A1 | 3/2005 | Perry | |
| 2005/0107920 A1 | 5/2005 | Ban | |
| 2006/0095158 A1 | 5/2006 | Lee | |
| 2006/0156978 A1* | 7/2006 | Lipson | A61L 27/44 |
| | | | 118/708 |
| 2007/0050084 A1 | 3/2007 | Song | |
| 2008/0243305 A1* | 10/2008 | Lee | B25J 9/1602 |
| | | | 700/246 |
| 2008/0247549 A1 | 10/2008 | Blanc | |
| 2008/0282494 A1* | 11/2008 | Won | A47L 11/4013 |
| | | | 15/319 |
| 2009/0044655 A1 | 2/2009 | DeLouis | |
| 2009/0198379 A1 | 8/2009 | Komuro | |
| 2010/0180711 A1 | 7/2010 | Kilibarda | |
| 2012/0053728 A1 | 3/2012 | Theodorus | |
| 2012/0215354 A1 | 8/2012 | Krasny | |
| 2012/0265344 A1 | 10/2012 | Nakahara | |

* cited by examiner

SMART ROBOT PART

RELATED APPLICATION

This patent application claims priority to U.S. application Ser. No. 14/878,175, filed on Oct. 8, 2015, the contents of which are entirely incorporated herein by reference, as if fully set forth in this application.

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working in various environments becomes apparent. Therefore, a demand for such robotic systems has helped open up a field of innovation in robot parts, sensing techniques, as well as component design and assembly.

SUMMARY

Example implementations may relate to a stand-alone robot part that can connect to each of various robotic systems and can provide a particular robotic system with additional sensing capabilities, additional processing resources, and connectivity to the cloud. In accordance with such example implementations, a processor of the robot part may determine that the robot part is mechanically and electrically connected to a particular robotic system, such as by way of any connector arrangement. In response to determining that the robot part is connected to the particular robotic system, the processor may identify the particular robotic system by obtaining identification information from an on-board data storage and/or from the cloud, among other possibilities.

While the robot part is connected to the particular robotic system, the processor of the robot part may transmit, to the cloud, sensor data that the processor received from sensors of the robot part. Once the processor transmits such sensor data, the cloud may process the sensor data to determine information representative of characteristics of an environment in which the particular robotic system is operating, such as characteristics of objects positioned in the environment, for instance. With this arrangement, the cloud may then transmit this environment information to the processor of the robot part.

Once the robot part identifies the robotic system and receives such environment information, the processor may then use the identification information and the environment information to control functionality of the robotic system. In particular, the processor may generate a command that causes the robotic system to carry out a task in the environment. For example, this command may cause the robotic system to move the robot part to a certain spatial position that would allow the robot part (e.g., including a suction gripper, a finger gripper, or another gripping mechanism) to grasp onto an object in the environment. And in another example, this command may cause the robotic system to carry out various movements, so as to allow the processor of the robot part to learn about movement capabilities of the robotic system. Other examples are possible as well.

Accordingly, an example implementation may involve determining, by at least one processor of a robot part, that the robot part is removablly connected to a particular robotic system, where the robot part includes at least one sensor and at least one interface providing wireless connectivity. The implementation may also involve, in response to determining that the robot part is removablly connected to the particular robotic system, obtaining, by the at least one processor, identification information to identify the particular robotic system. The implementation may additionally involve, while the robot part is removablly connected to the particular robotic system, (i) transmitting, by the at least one processor to at least one external computing system, sensor data that the at least one processor received from the at least one sensor and (ii) receiving, by the at least one processor from the at least one external computing system, environment information based on interpretation of the sensor data, where the environment information represents one or more characteristics of an environment in which the particular robotic system is operating. The implementation may further involve, based at least in part on the identification information and the environment information, generating, by the at least one processor, a command that causes the particular robotic system to carry out a task in the environment.

In another aspect, a non-transitory computer readable medium is provided. The non-transitory computer readable medium has stored therein instructions executable by one or more processors to cause a robot part to perform operations. The operations include determining that the robot part is removablly connected to a particular robotic system, wherein the robot part includes at least one sensor and at least one interface providing wireless connectivity. The operations also include, in response to determining that the robot part is removablly connected to the particular robotic system, obtaining identification information to identify the particular robotic system. The operations additionally include, while the robot part is removablly connected to the particular robotic system, (i) transmitting, to at least one external computing system, sensor data that the at least one processor received from the at least one sensor and (ii) receiving, from the at least one external computing system, environment information based on interpretation of the sensor data, where the environment information represents one or more characteristics of an environment in which the particular robotic system is operating. The operations further include, based at least in part on the identification information and the environment information, generating a command that causes the particular robotic system to carry out a task in the environment.

In yet another aspect, a robot part is provided. The robot part includes at least one interface providing wireless connectivity, at least one sensor, at least one processor, a non-transitory computer readable medium, and program instructions stored on the non-transitory computer readable medium and executable by the at least one processor to determine that the robot part is removablly connected to a particular robotic system. The program instructions are also executable to, in response to determining that the robot part is removablly connected to the particular robotic system, obtain identification information to identify the particular robotic system. The program instructions are additionally executable to, while the robot part is removablly connected to the particular robotic system, (i) transmit, to at least one external computing system, sensor data that the at least one processor received from the at least one sensor and (ii) receive, from the at least one external computing system, environment information based on interpretation of the sensor data, where the environment information represents one or more characteristics of an environment in which the particular robotic system is operating. The program instructions are further executable to, based at least in part on the identification information and the environment information, generate a command that causes the particular robotic system to carry out a task in the environment.

In yet another aspect, a system is provided. The system may include means for determining that a robot part is removablly connected to a particular robotic system, where the robot part includes at least one sensor and at least one interface providing wireless connectivity. The system may also include means for, in response to determining that the robot part is removablly connected to the particular robotic system, obtaining identification information to identify the particular robotic system. The system may additionally include means for, while the robot part is removablly connected to the particular robotic system, (i) transmitting, to at least one external computing system, sensor data that the at least one processor received from the at least one sensor and (ii) receiving, from the at least one external computing system, environment information based on interpretation of the sensor data, where the environment information represents one or more characteristics of an environment in which the particular robotic system is operating. The system may further include means for, based at least in part on the identification information and the environment information, generating a command that causes the particular robotic system to carry out a task in the environment.

These as well as other aspects, advantages, and alternatives will become apparent to those of ordinary skill in the art by reading the following detailed description, with reference where appropriate to the accompanying drawings.

DETAILED DESCRIPTION

Figure 1:
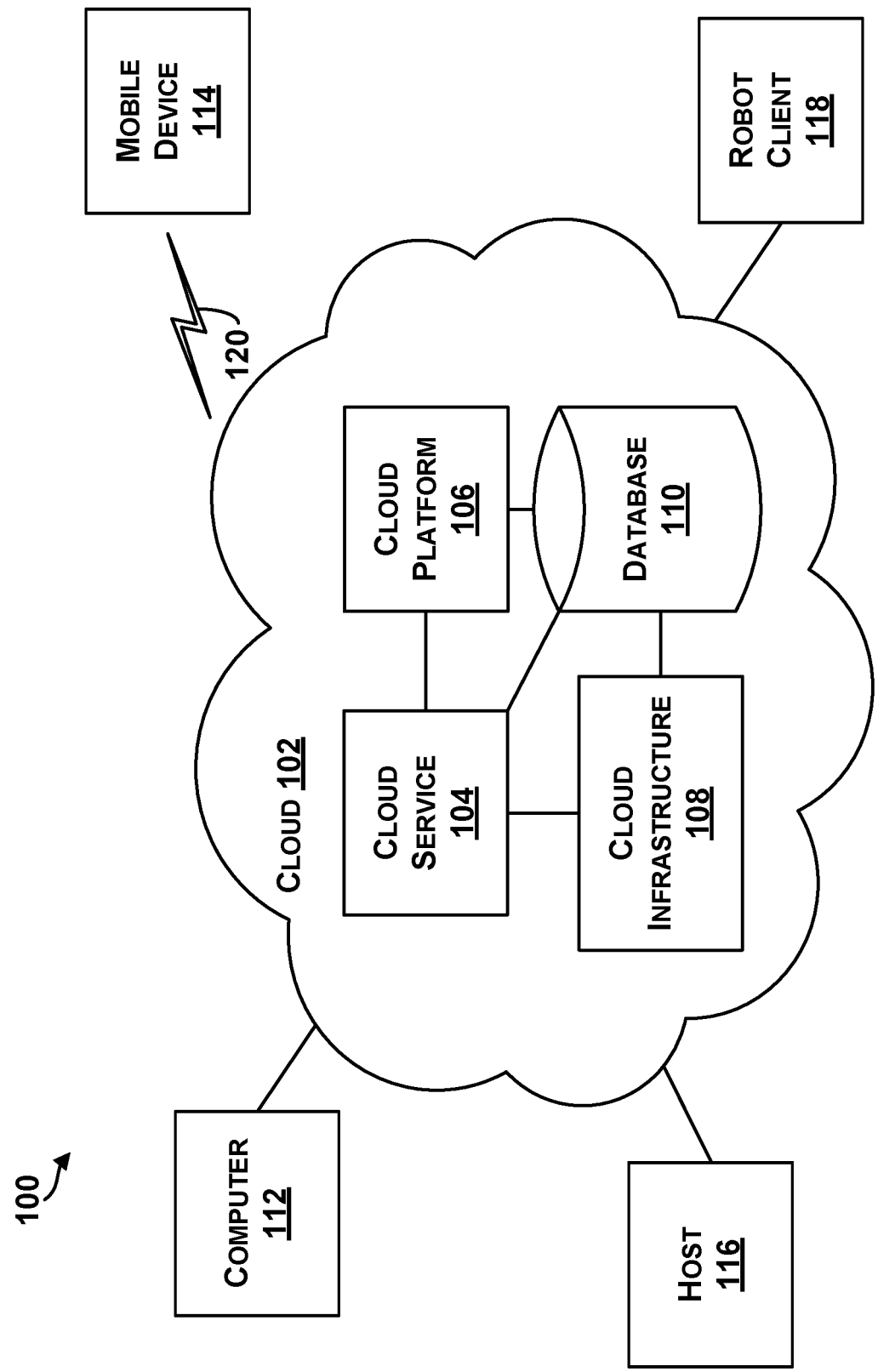
FIG. 1 illustrates a system for cloud-based computing, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various implementations, described herein is a stand-alone robot part that can connect to each of various robotic systems. This robot part may include a processor, various sensors, and an interface for wirelessly communicating with the cloud, among other components. When this robot part is connected to a robotic system, the robot part can obtain sensor data from both sensors of the robot part and sensors of the robotic system, and the robot part can then obtain information about the environment based on this sensor data. By way of example, the robot part may transmit this sensor data to the cloud along with a request to interpret this sensor data. The cloud may then process the sensor data and may transmit to the robot part information about the environment, such as information identifying objects in the environment as well as information identifying characteristics of such objects for instance.

Once the robot part obtains information about the environment, the robot part may use such information as a basis for controlling certain operations of the robotic system. For instance, the robot part may engage in a calibration phase during which the robot part obtains further information regarding capabilities of the robotic system. As part of this calibration phase, the robot part may direct the robotic system to carry out various movements. Also, the robot part may evaluate and/or record these movements to determine a kinematic model of the robotic system and thus determine movement capabilities of the robotic system. Once the calibration phase is complete, the robot part may then transmit these capabilities for storage on the cloud. In this way, the robot part can obtain the capabilities in the future and/or such capabilities may be obtained for use by other similar robot parts.

In another instance, the robot part may control certain operations of the robotic system by transmitting, to the robotic system, commands that cause the robotic system to carry out various tasks in the environment. By way of example, the robot part may operate the robotic system to ultimately grasp onto an object in the environment. In particular, the robot part may direct the robotic system to move the robot part to a spatial location that is sufficiently close to the object. Once the robot part is at this spatial location, the robot part may use a gripper of the robot part to grasp onto the object. Moreover, when manipulating an object in this manner, the robot part could obtain, from the cloud, information related to a technique for grasping onto a particular object, as well as other information.

Given such implementation, the robot part disclosed herein may provide existing robotic systems (or robotic systems developed in the future) with additional features that these robotic systems otherwise may not have. For example, the robot part may provide an existing robotic system with additional processing power as well as with additional sensing capabilities. Moreover, the robot part may provide an existing robotic system with connectivity to the cloud. With such connectivity to the cloud, the robotic system may gain yet further computational resources, which may ultimately allow the robotic system to carry out operations in a less time consuming manner as well as to carry out operations that the robotic system was previously unable to carry out, among other advantages.

II. Illustrative Cloud Computing Architecture

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium large enough to hold all of these files.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud-based application. In addition, dividing application execution and storage between the client and server devices allows more processing to be performed by the server devices, thereby taking advantage of the server devices' processing power and capability, for example. In another example, cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. In this example, details of the architecture may be transparent to users of client devices. Other examples are possible.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described operations of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of components of the cloud 102, and thus, may interact with the cloud service 104. Further, the database 110 may represent storage capabilities by the cloud 102, and thus, may be accessed by any of the cloud service 104, the cloud platform 106, and/or the infrastructure 108.

The system 100 includes a number of example client devices coupled to or configured to be capable of communicating with components of the cloud 102. For example, a computer 112, a mobile device 114, and a host 116 are shown coupled to the cloud 102. Of course, more or fewer client devices may be coupled to the cloud 102. In addition, different types of client devices may be coupled to the cloud 102. More specifically, the computer 112 may be any type of computing device (e.g., PC, laptop computer, etc.), and the mobile device 114 may be any type of mobile computing device (e.g., laptop, mobile telephone, cellular telephone, etc.). Also, the host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118 (and/or to a computing device that is associated with the robot client 118). In some examples, as shown in FIG. 1, the cloud 102 may include a computer that is not co-located with the robot client 118. In other examples, the robot client 118 may send data to a second client (e.g., computer 112) for processing.

In FIG. 1, communication links between client devices and the cloud 102 may include wired connections, such as a serial or parallel bus. Communication links may also be wireless links, such as link 120, which may include Bluetooth, IEEE 802.11, a wide area wireless link (e.g., cellular) or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), Long- Term Evolution (LTE), Global System for Mobile Communication (GSM), General Packet Radio Service (GPRS), Code division multiple access (CDMA), Evolution-Data Optimized (EV-DO), and/or High-Speed Downlink Packet Access (HSPDA), among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

III. Illustrative Robotic System

Figure 2A:
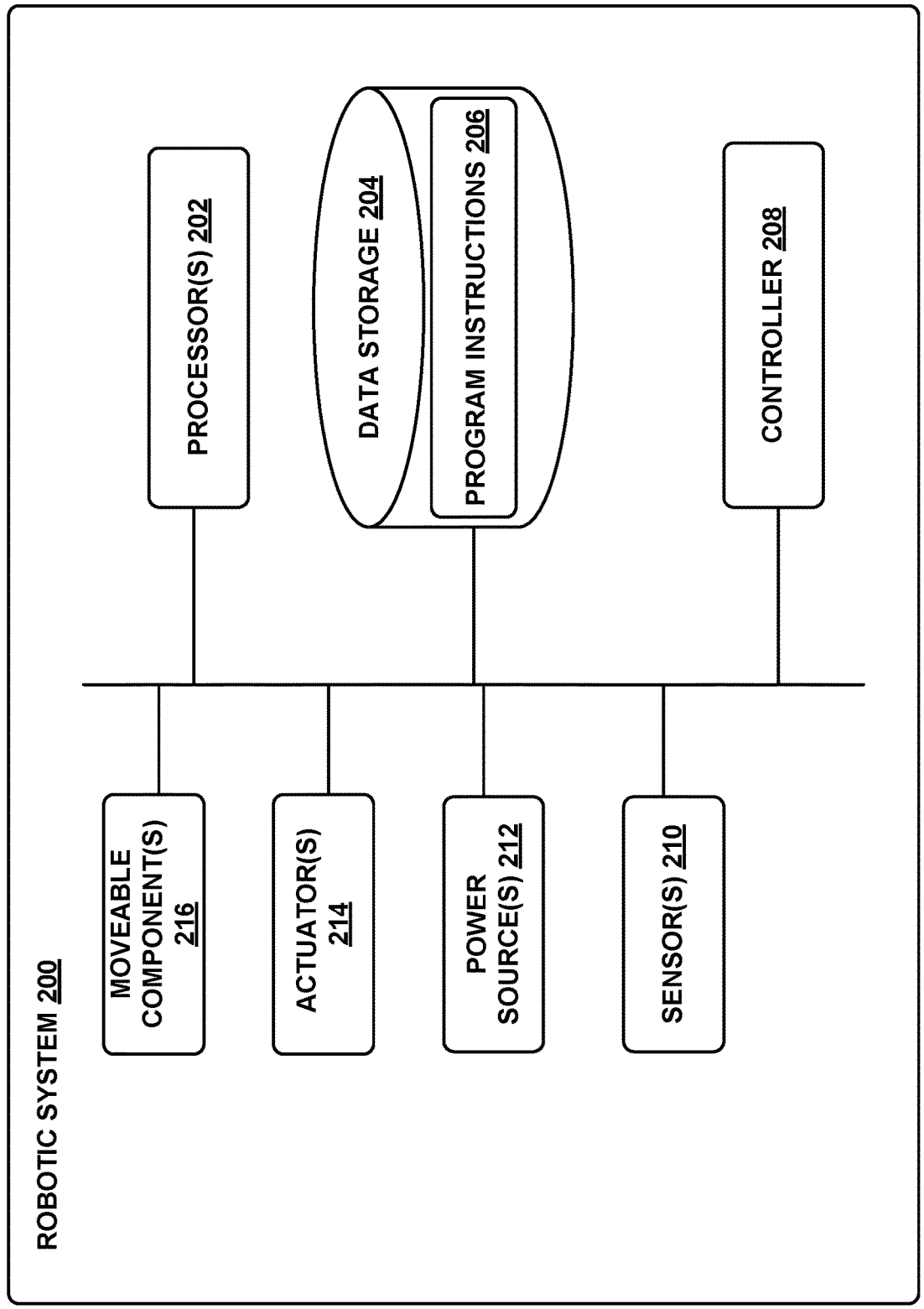
FIG. 2A illustrates a configuration of a robotic system, according to an example implementation.

FIG. 2A shows an example configuration of a robotic system 200. Robotic system 200 may be any device that has a computing ability and interacts with its surroundings with an actuation capability and/or with ability to emit/generate physical phenomena such as light and/or sound, among others. For instance, the robotic system 200 may be a humanoid robot, a robotic arm, or a quadruped robot, among others. Additionally, the robotic system 200 may also be referred to as a robotic device, a robotic manipulator, a robot client, or a robot, among others.

The robotic system 200 is shown to include processor(s) 202, data storage 204, program instructions 206, controller 208, sensor(s) 210, power source(s) 212, actuator(s) 214, and movable component(s) 216. Note that the robotic system 200 is shown for illustration purposes only and robotic system 200 may include additional components and/or have one or more components removed without departing from the scope of the disclosure. Further, note that the various components of robotic system 200 may be arranged and connected in any manner.

Processor(s) 202 may be one or more general-purpose processors or special purpose processors (e.g., digital signal processors, application specific integrated circuits, etc.). The processor(s) 202 can be configured to execute computer-readable program instructions 206 that are stored in the data storage 204 and are executable to provide the functionality of the robotic system 200 described herein. For instance, the program instructions 206 may be executable to instruct an actuator 214 to cause movement of one or more movable component(s) 216.

The data storage 204 may include or take the form of one or more computer-readable storage media that can be read or accessed by processor(s) 202. The one or more computer-readable storage media can include volatile and/or non-volatile storage components, such as optical, magnetic, organic or other memory or disc storage, which can be integrated in whole or in part with processor(s) 202. In some implementations, the data storage 204 can be implemented using a single physical device (e.g., one optical, magnetic, organic or other memory or disc storage unit), while in other implementations, the data storage 204 can be implemented using two or more physical devices. Further, in addition to the computer-readable program instructions 206, the data storage 204 may include additional data such as diagnostic data, among other possibilities. Additionally, controller 208 (e.g., taking the form of a microcontroller) may include processing unit and data storage, and may be arranged to manage or carry out various operations (e.g., individually or in collaboration with processor(s) 202). Other implementations are possible as well.

Further, the robotic system 200 may include one or more sensor(s) 210 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, a light detection and ranging (LIDAR) device, a structured-light scanner, and/or a time-of-flight camera), a stereo camera, motion sensors (e.g., gyroscope, accelerometer, inertial measurement unit (IMU), and/or foot step or wheel odometry), and/or range sensors (e.g., ultrasonic and/or infrared), among others. The sensor(s) 210 may provide sensor data to the processor(s) 202 to allow for appropriate interaction of the robotic system 200 with the environment. Additionally, the robotic system 200 may also include one or more power source(s) 212 configured to supply power to various components of the robotic system 200. Any type of power source may be used such as, for example, a gasoline engine or a battery.

The robotic system 200 may also include one or more actuator(s) 214. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 214 may cause movement of various movable component(s) 216 of the robotic system 200. The moveable component(s) 216 may include appendages/members such as robotic arms, legs, and/or hands, among others. The moveable component(s) 216 may also include a movable base, wheels, and/or end effectors, among others.

Further, when a robotic system 200 includes at least one end effector, such an end effector may be a tool (e.g., a screwdriver, drill, welding iron, or some combination thereof) and/or a gripper, among others. In this regard, the robotic system 200 may also include one or more connector arrangements (not shown) for establishing connections to at least one end effector or otherwise to any stand-alone robot part, such as robot part 300 described below. Such connector arrangements may include mechanical connector arrangements used for mechanically coupling the robotic system 200 to a stand-alone robot part. For example, these mechanical connector arrangements may take on any arrangement and may include (without limitation) a combination of any of the following: fasteners, nuts, bearings, plates, clamps, latches, seals, splines, and locking mechanism, among others. Also, such connector arrangements may include electrical connector arrangements used for transferring power and/or communications between the robotic system 200 and a stand-alone robot part. For example, these electrical connector arrangements may take on any arrangement (e.g., wired or wireless) and may include (without limitation) a combination of any of the following: eight positions/eight conductors (8P8C) connectors, D-subminiature connectors, Universal Serial Bus (USB) connectors, power connectors, and radio frequency (RF) connectors, among others. Other examples are possible as well.

Figure 2B:
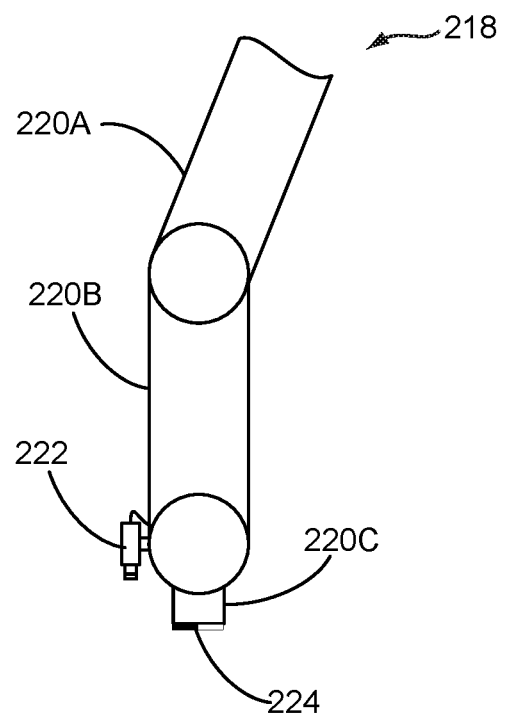
FIG. 2B illustrates a robotic arm, according to an example implementation.

A robotic system 200 may take on various forms. To illustrate, refer to FIG. 2B showing an example robotic arm 218. As shown, the robotic arm 218 includes movable component(s) 216, such as members 220A to 220C, which allow the robotic arm 218 to move around and interact with the environment. Additionally, the robotic arm 218 is shown to include a sensor 222, such as one or more of the sensors discussed above. Further, the robotic arm 218 includes a connector arrangement 224, which may include the mechanical and electrical connector arrangements discussed above in association with FIG. 2A. Other example forms are possible as well.

IV. Illustrative Smart Robot Part

Figure 3A:
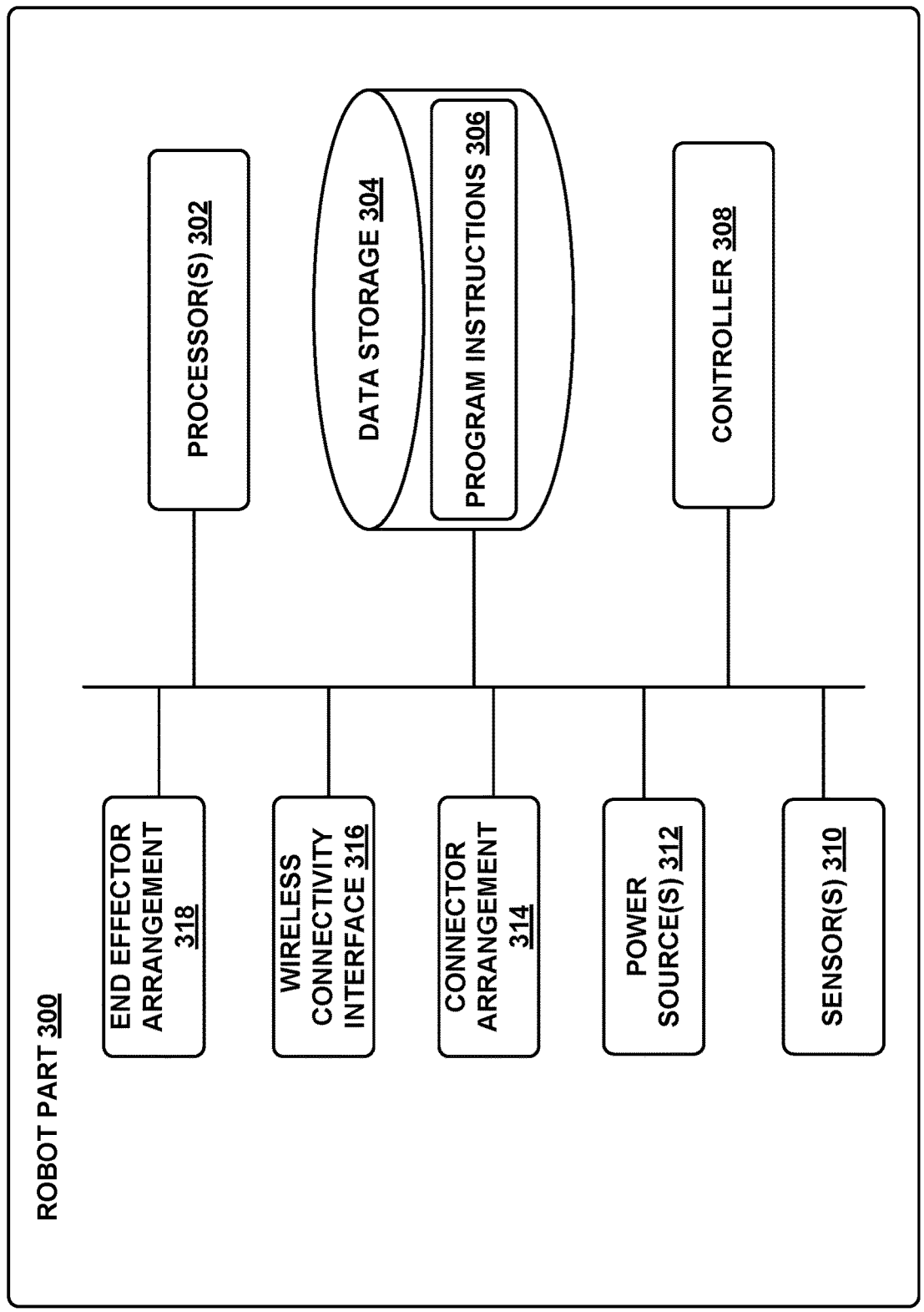
FIG. 3A illustrates a configuration of a robot part, according to an example implementation.

FIG. 3A shows an example configuration of the smart robot part 300 disclosed herein. Robot part 300 may be a stand-alone robot part having sensing and processing capabilities that the robot part 300 may use to provide a robotic system 200 with additional sensing and processing resources, such as when the robot part 300 is connected to the robotic system 200.

In particular, the robot part 300 is shown to include processor(s) 302, data storage 304, program instructions 306, controller 308, sensor(s) 310, power source(s) 312, connector arrangement 314, wireless connectivity interface 316, and end effector arrangement 318. Note that the robot part 300 is shown for illustration purposes only and robot part 300 may include additional components and/or have one or more components removed without departing from the scope of the disclosure. Further, note that the various components of robot part 300 may be arranged and connected in any reliable manner.

Moreover, the above description of processor(s) 202, data storage 204, program instructions 206, sensor(s) 210, power source(s) 212, and connector arrangements may apply to any discussion below relating to the respective component being used in another system or arrangements. For instance, as noted, FIG. 3A (among other possible figures) illustrates processors, data storage, program instructions, sensors, power sources and/or connector arrangements as being incorporated in another arrangement. These components at issue may thus take on the same or similar characteristics (and/or form) as the respective components discussed above in association with FIG. 2A. However, the components at issue could also take on other characteristics (and/or form) without departing from the scope of the disclosure.

As noted, the robot part 300 is shown to include a wireless connectivity interface 316. This wireless connectivity interface 316 may provide wireless connectivity to an external computing system, such as to the cloud 102 architecture discussed above. Moreover, this wireless connectivity interface 316 may take various forms. For example, the wireless connectivity interface 316 may provide interfaces for communications via communication links such as Bluetooth, IEEE 802.11, or other wireless based communication links. In another example, the wireless connectivity interface 316 may provide interfaces for communications with access points. As noted, an access point may take the form of a wireless access point (WAP) or wireless router. In yet another example, if the wireless connectivity interface 316 connects using a cellular air-interface protocol, such as a CDMA or GSM protocol, the wireless connectivity interface 316 may provide interfaces for communications with a base station in a cellular network that provides Internet connectivity via the cellular network. Other examples are also possible.

Further, the end effector arrangement 318 may take various forms. In one example, the end effector arrangement 318 may provide for electrical and mechanical connectivity (e.g., via a connector arrangement as discussed above) to external end effectors, such as grippers and/or tools, among other possibilities. Alternatively, the end effector arrangement 318 may itself include one or more end effectors that are each already electrically and mechanically connected to various components of the robot part 300. Other arrangements are possible as well.

Figure 3B:
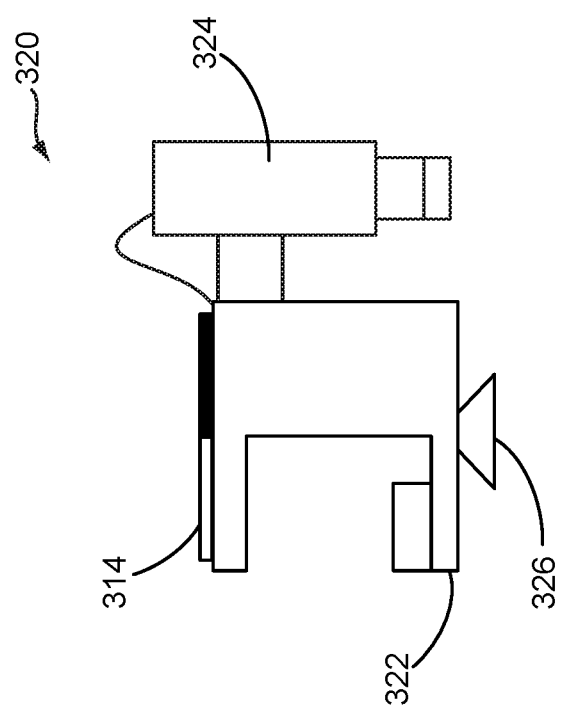
FIG. 3B illustrates a robot part, according to an example implementation.

A robot part 300 may take on various forms. To illustrate, refer to FIG. 3B showing an example robotic part 320. As shown, the robot part 320 includes a housing 322, which may house one or more of the components of the example robot part 320. Also, the robot part 320 may include a sensor 324, such as one or more of the sensors discussed above (e.g., an image capture device). Additionally, the robot part 320 may include an end effector taking the form of a gripper 326, such as a suction gripper for instance. This gripper 326 may be used to grasp onto various objects in the environment. Further, the robot part 320 includes a connector arrangement 314, which may include the mechanical and electrical connector arrangements discussed above in association with FIG. 2A. Other example forms are possible as well.

V. Illustrative Methods

Figure 4:
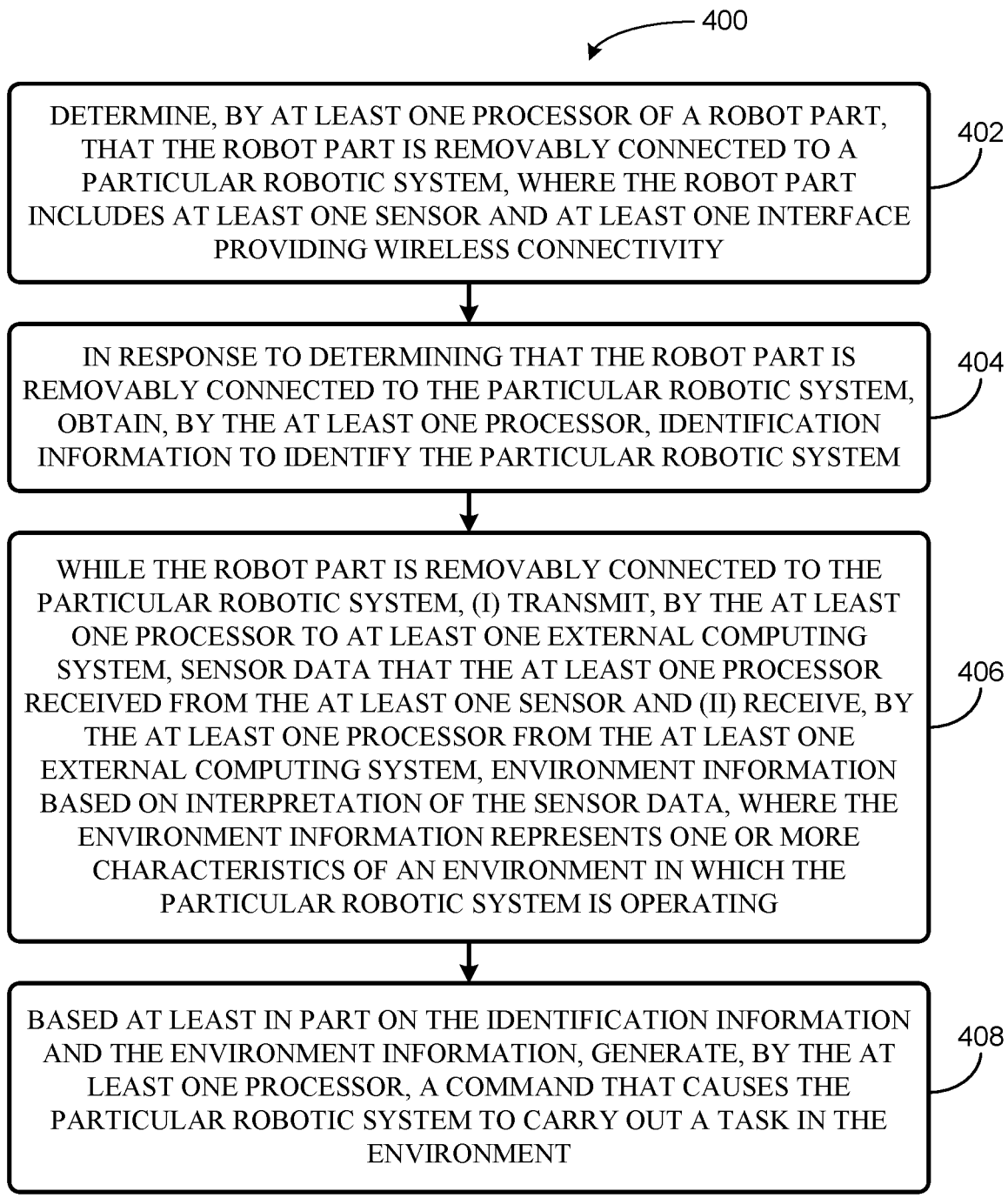
FIG. 4 is a flowchart for generating a command that causes a robotic system to carry out a task in the environment, according to an example implementation.

FIG. 4 is a flowchart 400, according to an example implementation. In particular, the operations of flowchart 400 may be implemented to cause the robot part 300 to operate the robotic system 200.

FIG. 4 presents a operations that can be carried out within an arrangement involving, for example, the robot part 300 (or more particularly by one or more components or subsystems thereof, such as by a processor and a non-transitory computer-readable medium having instructions that are executable to cause the device to perform functions described herein). Additionally or alternatively, these operations may be implemented within any other arrangements and systems. Moreover, although the blocks 402-408 of flowchart 400 are illustrated in sequential order, these blocks may also be performed in parallel, and/or in a different order than those described herein. Also, the various blocks may be combined into fewer blocks, divided into additional blocks, and/or removed based upon the desired implementation.

In addition, flowchart 400 shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in FIG. 4 may represent circuitry that is wired to perform specific logical operations illustrated herein.

Block 402 involves determining, by at least one processor (e.g., processor(s) 302) of a robot part (e.g., robot part 300), that the robot part is connected to a particular robotic system (e.g., robotic system 200), where the robot part includes at least one sensor (e.g., sensor(s) 310) and at least one interface providing wireless connectivity (e.g., wireless connectivity interface 316).

Figure 5A:
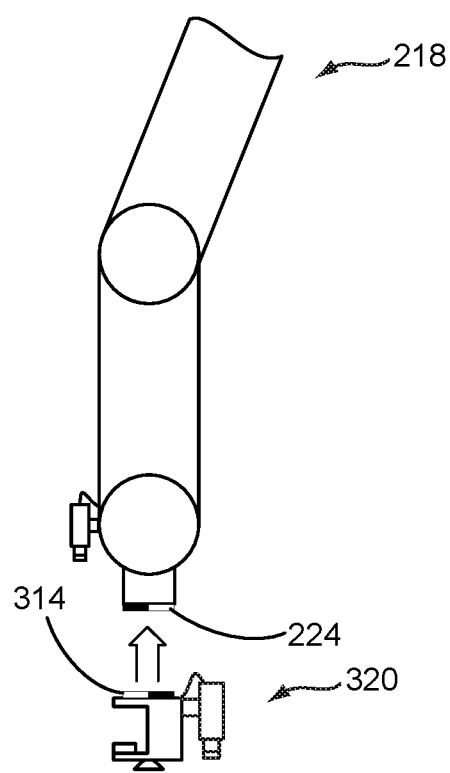
FIGS. 5A and 5B illustrate connection of the robot part to the robotic arm, according to an example implementation.
Figure 5B:
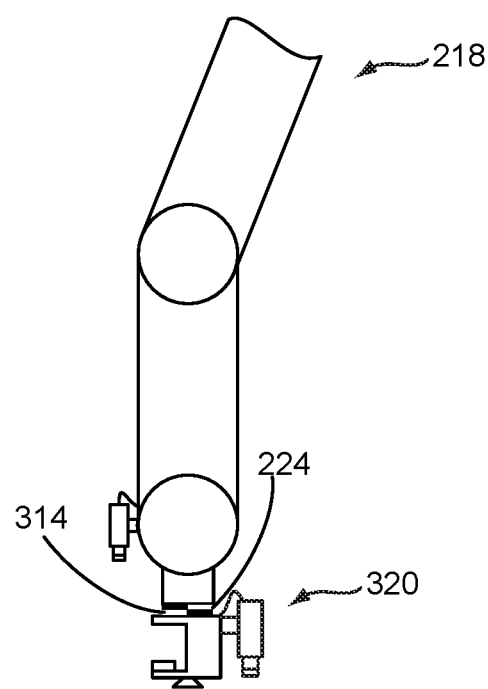

In an example implementation, the robot part 300 may electrically and mechanically connect to the robotic system 200. In particular, the connector arrangement 314 of robot part 300 may connect to a connector arrangement of the robotic system 300. For example, FIG. 5A illustrates the example robot part 320 in the process of being connected to the example robotic arm 218. As shown, this specifically involves the example connector arrangement 314 in the process of being connected to the example connector arrangement 224. And then at FIG. 5B, the example connector arrangements 224 and 314 are shown as connected, thereby resulting in an electrical and mechanical connection (and perhaps a hydraulic connection) between the example robot part 320 and the example robotic arm 218.

Upon the robot part 300 electrically and mechanically connecting to the robotic system 200, processor(s) 302 (for convenience will be referred to as a processor 302) may determine in various ways that the robot part 300 indeed connected to the robotic system 200. For example, the robot part 300 may include a sensor positioned on the connector arrangement 314, such as a touch sensor for instance. In this example, once the robot part 300 is mechanically connected to the robotic system 200, the touch sensor may generate touch data due to the touch sensor making contact with the robotic system 200. The touch sensor may transmit this touch data to the processor 302, and the processor 302 then use reception of this touch data from the touch sensor as an indication that the robot part 300 connected to the robotic system 200. And in another example, once the robot part 300 is electrically connected to the robotic system 200, the processor 302 may receive an electrical signal from a processor 202 of the robotic system 202. For instance, this signal may be a low amplitude signal generated periodically by the robotic system 200 (e.g., a "heartbeat" signal) so as to indicate presence of the robotic system 200. Alternatively, the signal may take on other forms as well. In either case, once the processor 302 receives this signal, then this may serve as an indication to the processor 302 that the robot part 300 connected to the robotic system 200. Other examples are possible as well.

Block 404 involves, in response to determining that the robot part is connected to the particular robotic system, obtaining, by the at least one processor, identification information to identify the particular robotic system.

In an example implementation, the processor 302 may obtain the identification information in various ways. For example, the processor 302 may receive, from the processor 202, an identifier of the robotic system 200. In one case, the processor 302 may receive this identifier as part of the above-mentioned signal. In another case, the processor 302 may transmit to the processor 202 a request for the identifier and may then responsively receive the identifier from the processor 202. In yet another case, the processor 302 may read the identifier from memory (e.g., data storage 204). And in yet another case, the processor 302 may obtain the identifier during an initiation handshake. In either case, this identifier may be a serial number associated with the robotic system 200, among other possibilities.

Once the processor 302 receives this identifier, the processor 302 may use this identifier as a basis for obtaining additional identification information regarding the robotic system 200. This additional identification information may include (without limitations): a model number of the robotic system 200, a type of the robotic system 200, a manufacturer of the robotic system 200, technical specifications of the robotic system 200, protocols (e.g., communication protocols) used by the robotic system 200, and/or capability information (further discussed below) of the robotic system 200, among others. Moreover, this additional identification information may have been provided via manual engineering input and/or may have been previously determined by some processor, among other possibilities. Regardless, the processor 302 may obtain this additional identification information in various ways.

By way of example, the data storage 304 of robot part 300 may contain mapping data that maps certain identifiers to additional information related to certain robotic systems. In this example, the processor 302 may refer to this mapping data to determine additional information that corresponds to the received identifier. And in another example, the cloud 102 (e.g., database 110) may contain such mapping data. In this example, the processor 302 may transmit, to the cloud 102, a query including the identifier of the robotic system 200 along with a request for additional information. Once the cloud 102 receives this query, the cloud 102 may responsively refer to the mapping data and may then transmit to the processor 302 (e.g., via the wireless connectivity interface 316) one or more data packets including the additional identification information. Other examples are possible as well.

Block 406 involves, while the robot part is connected to the particular robotic system, (i) transmitting, by the at least one processor to at least one external computing system, sensor data that the at least one processor received from the at least one sensor and (ii) receiving, by the at least one processor from the at least one external computing system, environment information based on interpretation of the sensor data, where the environment information represents one or more characteristics of an environment in which the particular robotic system is operating.

Figure 6:
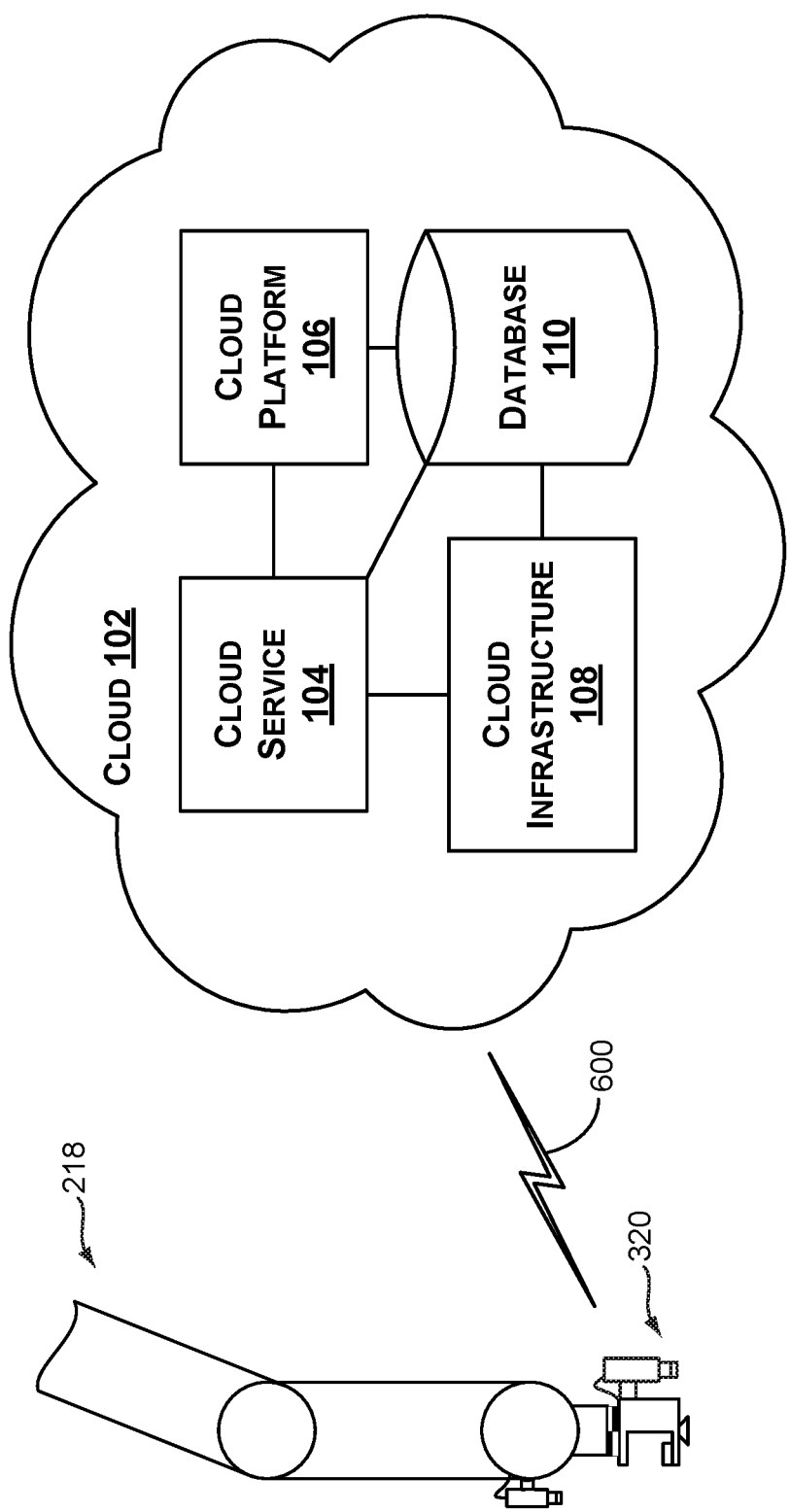
FIG. 6 illustrates communication between the system for cloud-based computing and the robot part while the robot part is connected to the robotic arm, according to an example implementation.

As noted, the processor 302 may communicate with the cloud 102 while the robot part 300 is connected to the robotic system 200. For example, FIG. 6 illustrates communication between the example robot part 320 and the cloud 102 via a wireless communication link 600 while the example robot part 320 is connection to the example robotic arm 218. In this implementation, the processor 302 may transmit data to the cloud 102 and may receive data from the cloud 102. Moreover, the processor 302 may receive data from the robotic system 200 (e.g., from processor 202) and may then transmit this data to the cloud 102. Also, the processor 302 may receive data from the cloud 102 and may then transmit this data to the robotic system 200 (e.g., to the processor 202). In this manner, the robot part 300 may provide a robotic system with an ability to communicate with the cloud 102 even though the robotic system may not itself have the ability to communicate with the cloud 102, thereby providing this robotic system at issue with additional processing resources.

With this arrangement, the processor 302 may transmit, to the cloud 102, sensor data that the processor 302 receives from one or more of the sensor(s) 310 of the robot part 302. Additionally or alternatively, the processor 302 may transmit to the cloud 102 sensor data that the processor 302 receives from one or more of the sensor(s) 210 of the robotic system 200. This sensor data could be transmitted in the form of one or more data packets and this sensor data could take various forms. For instance, the sensor data may be image data, temperature data, proximity data, touch data, audio data, motion data, force data, velocity data, location data, and/or timing data, among other possibilities.

Figure 7:
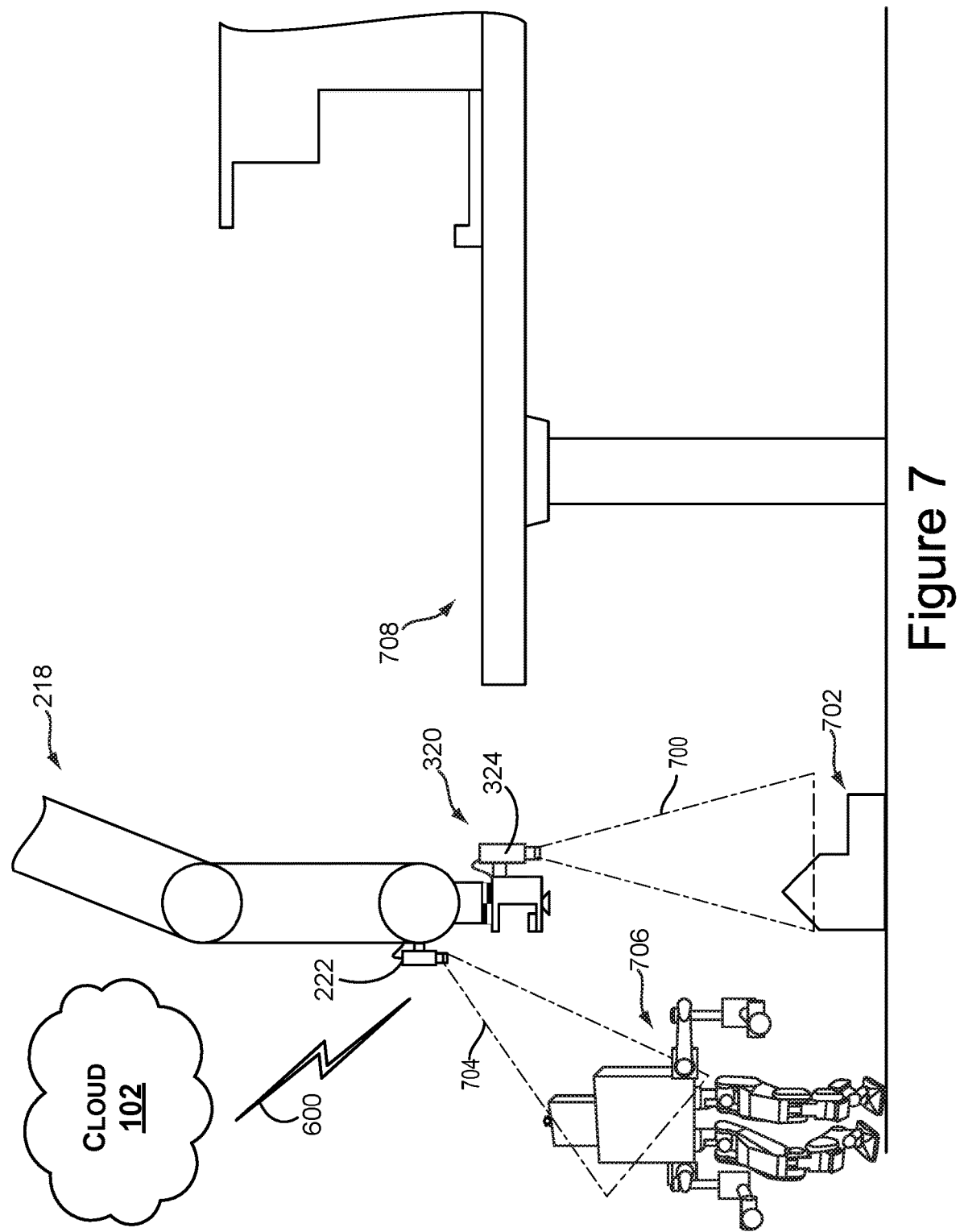
FIG. 7 illustrates transmission of sensor data from the robot part to the system for cloud-based computing, according to an example implementation.

FIG. 7 illustrates transmission of such sensor data to the cloud 102. In particular, example sensor 324 is shown as receiving image data 700 representative of an object 702 positioned in the environment. Also, example sensor 222 is shown as receiving image data 704 representative of a humanoid robot 706 positioned in the environment. The processor 302 may obtain the image data 700 and the image data 704 and may then transmit the image data 700 and the image data 704 to the cloud 102. Other examples are possible as well.

Once the cloud 102 receives such sensor data, the cloud 102 may store and/or process this sensor data. For instance, the cloud 102 may interpret (e.g., upon request by processor 302) the sensor data to determine environment information that is representative of characteristics of an environment in which the robotic system 200 is operating. In particular, determining this environment information may involve (without limitation): object (and/or facial) recognition, determining characteristics of one or more objects, determining object grasping techniques, and/or determining a map of the environment, among others. Once the cloud 102 determines this environment information, the processor 302 may receive this environment information from the cloud 102.

By way of example, robot part 320 may obtain image data 700 of the object 702 and may upload the image data 700 to the cloud 102. An object recognition program on the cloud 102 may identify the object 702 in the image data 700 and may provide data about the identified object 702 to the robot part 320, as well as possibly about other characteristics (e.g., metadata) of the identified object, such as a location, size, weight, color, etc. In this example, the cloud 102 may thus include information about objects that can be used to distinguish objects. For instance, the cloud 102 may include general information regarding an object (e.g., such as a computer), and additionally, information regarding a specific computer (e.g., a model number, details or technical specifications of a specific model, etc.).

With this arrangement, each object may have associated information in the cloud 102 including an object name, object details, object distinguishing characteristics, etc. Moreover, the cloud 102 may include a global unique identifier (GUID) for objects identified in the cloud 102 (e.g., to enable distinguishing between specific objects), and the GUID may be associated with any characteristics or information describing an object. Thus, the robot part 320 may be configured to access the cloud 102 to receive information generally distinguishing objects (e.g., a basketball vs. a computer), and to receive information that may distinguish between specific objects (e.g., two different computers).

In another example, robot part 320 may obtain image data 704 and may upload the image data 704 to the cloud 102. An image recognition program on the cloud 102 may determine that the image data 704 is representative of a humanoid robot and may provide an indication to the robot part 320 that the image data 704 is representative of a humanoid robot. In this example, the cloud 102 may thus help the robot part 320 determine presence of a humanoid robot in the environment. And the robot part 320 may then transmit commands (as further discussed below) while taking into consideration the presence of the humanoid robot 706, so as to ensure safety of the humanoid robot 706 for instance.

In a further aspect, this connectivity to the cloud 102 may allow for sharing of information among various entities, such as among robotic systems, robot parts, and other devices (e.g., computer 112 and/or mobile device 114). In particular, each entity having network-based connectivity may upload/publish data to the cloud 102 that can then be shared with any other entity. In this manner, various entities share experiences with each other to enable learned behaviors. By way of example, the robot part 320 may traverse a pathway while connected to the robotic arm 218 and may encounter an obstacle (e.g., platform 708 in FIG. 7). In this example, the robot part 320 can then inform other robot parts or other robotic systems (e.g., other than just robotic arm 218) of a location of the obstacle, such as by uploading the location to the cloud 102 for instance.

In another example, the robot part 320 may build a map of an area, and a different robot part (e.g., connected to a robotic arm other than robotic arm 218) can download the map to have knowledge of the area. In this example, the different robot part could update the map created by the robot part 320 with new information about the area (e.g., to include presence of new obstacles), or with new information collected from sensors that the robot part 320 may not have had (e.g., the different robot part may record and add temperature data to the map if the robot part 320 did not have a temperature sensor). In this manner, various robot parts, such as the robot part disclosed herein, may be configured to share data that is collected to enable faster adaptation, such that each robot part can build upon a learned experience of a previous robot part. Other examples are possible as well.

In some implementations, the processor 302 of the robot part 300 may be configured to process data instead of the cloud 102, or otherwise before requesting the cloud 102 to process any data. For example, the processor 302 may itself be configured to execute an object recognition program stored in data storage 304 of robot part 300. Also, data storage 304 may contain a database of information specifying object names, object details, and/or object distinguishing characteristics, among other possibilities. With this arrangement, the processor 302 can thus identify an object and can determine other characteristics (e.g., metadata) of the identified object, such as a location, size, weight, color, etc.

In some cases, however, the processor 302 might not be able to process certain data and/or might not be able to obtain sufficient information (e.g., from the data storage 304) to process certain data. For example, the data storage 304 might not contain sufficient information to allow the object recognition program of the robot part 300 to identify an object. In such cases, the processor 302 may obtain information from the cloud 102 that is necessary to appropriately process certain data or may otherwise request the cloud 102 to process the data. For example, the processor 302 can download from the cloud 102 image data originally obtain by the other robot parts or other robotic systems, so as to help the processor 302 identify an object using various views (e.g., in instances in which the other robot parts or other robotic systems have captured images of the object from a different perspective). And in another example, the processor 302 may transmit to the cloud 102 image data of an object along with a request to identify the object. Other examples are possible as well.

Block 408 involves, based at least in part on the identification information and the environment information, generating, by the at least one processor, a command that causes the particular robotic system to carry out a task in the environment.

Once the processor 302 obtains identification information, such as communication protocols used by the robotic system 200 and/or capability information, the processor 302 can then generate and then transmit commands to the robotic system 200 in accordance with this identification information. For instance, the processor 302 can transmit commands to the robotic system 200 in accordance with obtained communication protocols. Moreover, the processor 302 may generate a command based on environment information (e.g., obtained from the cloud 102 or determined by the processor 302). For instance, the processor 302 may generate a command based on obtained information related to certain object characteristics. With this arrangement, the command may cause the robotic system 200 to carry out a task in the environment at which the robotic system 200 is located.

More specifically, the processor 302 may generate the command in the form of computer-readable program instructions executable by processor 202 or perhaps by controller 208. When the processor 202 executes these program instructions, the robotic system 200 may carry out a task in the environment, such as by carrying out a set of operations specified in the program instructions. In some examples (as further discussed below), these operations may cause the robotic system 200 to essentially cooperate with the connected robot part 300 in order to grasp onto an object and/or to move the object. While in other examples (as further discussed below), these operations may cause the robotic system 200 to carry out various movements or other actions, so as to allow the robot part 300 to determine various capabilities of the robotic system 200. Other examples are possible as well.

VI. Determining Capabilities of the Robotic System

In an example implementation, the above-mentioned command may cause the robotic system 200 to engage in one or more particular movements. For instance, the command may instruct the robotic system 200 to operate one or more actuators 214 of the robotic system 200 and to do so with certain operational characteristics. These operational characteristics may involve certain torques, certain angular velocities, certain angular accelerations, and/or certain extents of angular rotations, among other possibilities. With this approach, the robotic system 200 may operate the actuators 214 in accordance with the command, so as to result in various movements of each of one or more moveable components 216.

In another approach, the command may instruct the robotic system 200 to move each of one or more moveable components 216 to certain spatial positions, such as by identifying these positions relative to a spatial coordinate system or by identifying positions of certain components relative to other components, among other possibilities. In this approach, the robotic system 200 may then separately determine how to operate the actuators 214 in order to move each of one or more moveable components 116 to the specified spatial positions. Other approaches are possible as well.

In this example implementation, the processor 302 of the robot part 300 may use these particular movements as a basis for determining movement capabilities of the robotic system 200. To do so, the processor 302 may evaluate and record information in response to the particular movements. This information may include (without limitation): joint angles that the robotic system 200 achieves during the particular movements, velocities at which the robotic system 200 was able to move moveable components 216 during the particular movements, and/or accelerations at which the robotic system 200 was able to move moveable components 216 during the particular movements, among other possibilities. Alternatively, the processor 202 may evaluate and record such information and may then report (e.g., upon request by processor 302) this information to the processor 302, among other possible approaches.

With this arrangement, determining movement capabilities of the robotic system 200 may involve determining or otherwise generating a kinematic model of the robotic system 200. This kinematic model may be representative of joint angle capabilities of the robotic system 200, of velocity capabilities of the robotic system 200, and/or of acceleration capabilities of the robotic system 200, among others. Moreover, the kinematic model may take various forms. For instance, the kinematic model may be a computer-readable listing of the various capabilities of the robotic system 200. By way of example, the listing may list a range of achievable joint angles and/or a range of achievable velocities, among other possibilities.

In a more specific example, the command may cause one or more actuators 214 to move each of one or more moveable components 216 to each of a plurality of spatial positions. Based on these movements, the processor 302 may determine and record a range of motion of each of the one or more moveable components 216. In particular, this may specifically involve determining a linear and/or angular distance that a given moveable component 216 can travel while attached to another component of the robotic system 200. Also, based on these movements, the processor 302 may determine and record degrees of freedom through which the robotic system 200 is capable of moving the one or more moveable component 216. Further, based on these movements, the processor 302 may determine and record velocities (and/or accelerations) at which the robotic system 200 is capable of moving each of the one or more moveable components 216. Moreover, based on these movements, the processor 302 may additionally or alternatively determine "invalid" spatial positions of the moveable component 216. For example, these may be positions that cause members to collide with one another. In another example, these may be positions that cause the robotic device 200 to become unstable. Other examples are possible as well.

Figure 8B:
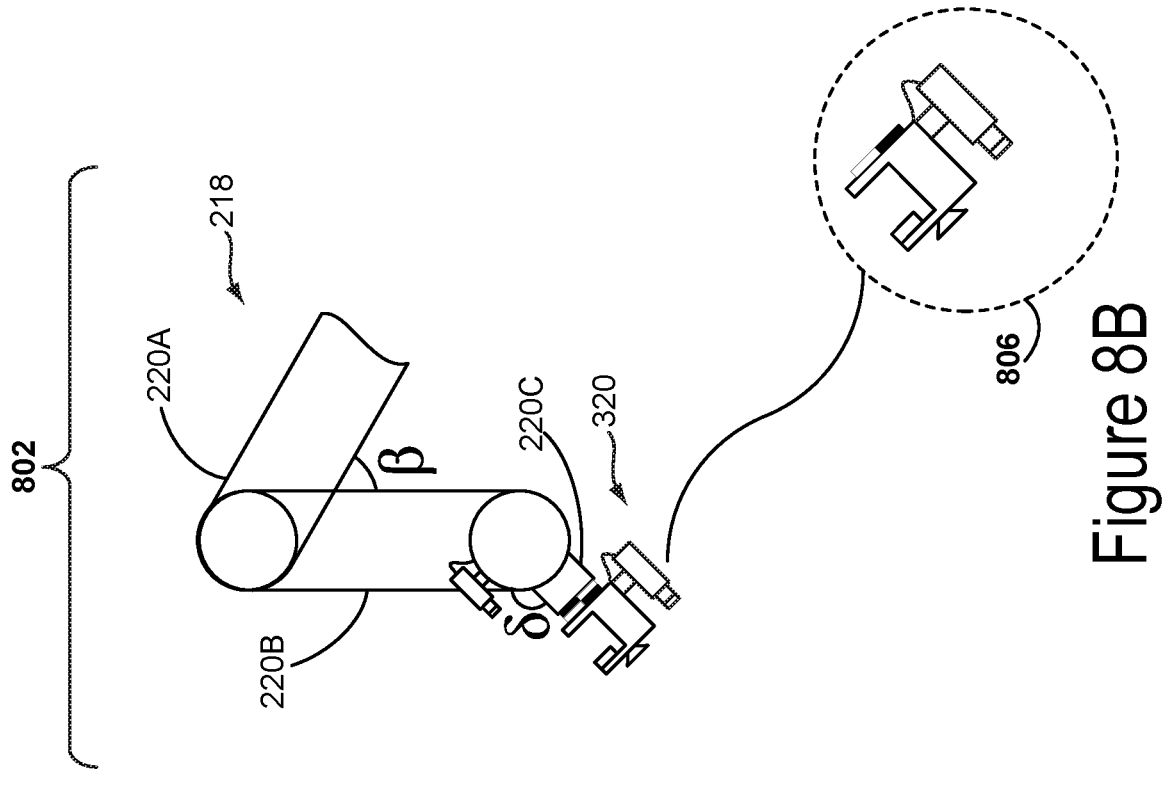
FIGS. 8A and 8B illustrate movement capabilities of the robotic arm, according to an example implementation.
Figure 8A:
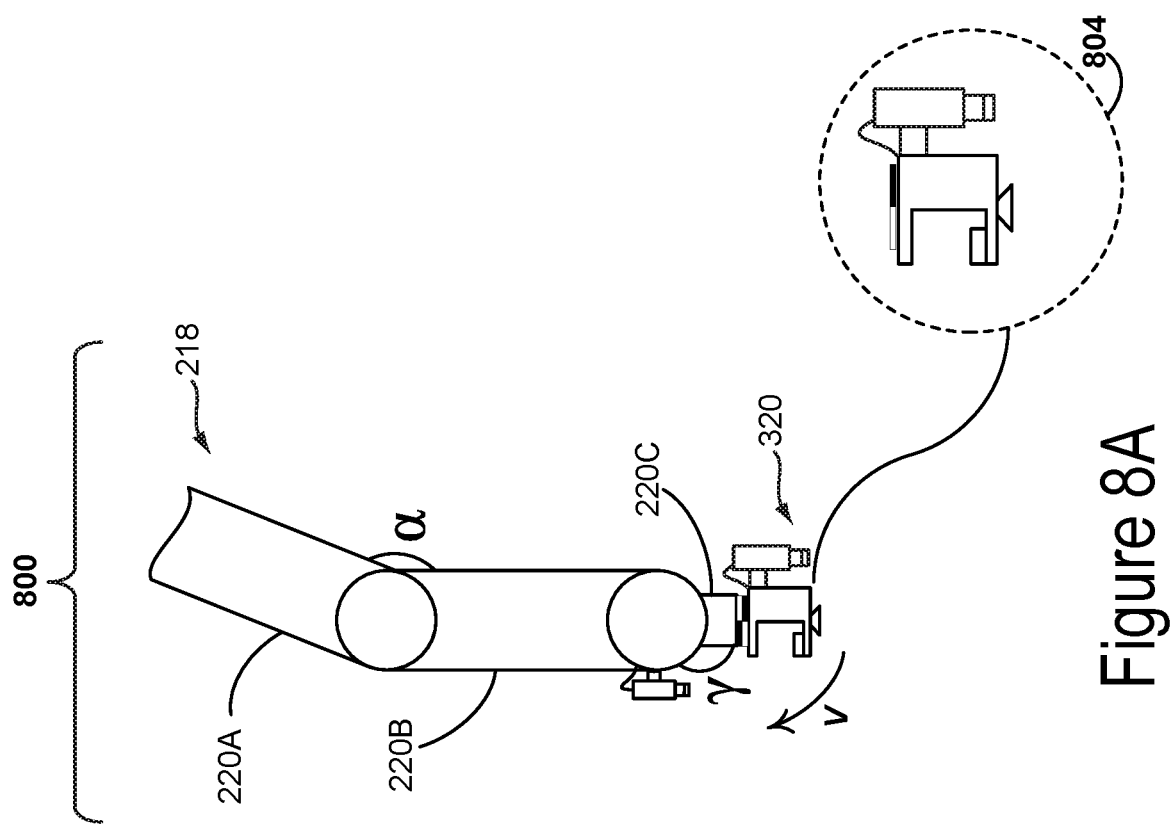

FIGS. 8A to 8B illustrate example movement capabilities of the robotic arm 218. In particular, FIG. 8A shows the robotic arm 218 positioned at position 800 while FIG. 8B shows the robotic arm 218 positioned at position 802. At position 800, the joint angle between members 220A and 220B is at angle α. The processor 302 may transmit a command to cause an actuator of the robotic arm 218 (e.g., an actuator linking the members 220A and 220B) to move member 220A about the joint in a certain direction (e.g., clockwise from the perspective of FIG. 8A). Position 802 then illustrates the joint angle at issue being at angle β. Accordingly, the processor 302 may determine that angle β is the smallest angle that the robotic arm 218 is able to achieve when moving member 220A in this direction and may then record this angle as the joint limit of the joint at issue.

Further, FIG. 8A shows the member 220C in a certain spatial position while FIG. 8B shows the member 220C as having been moved to a different spatial position. Moreover, FIG. 8A illustrates that the member 220C is being moved at an example angular velocity V. In accordance with the disclosure, the processor 302 may transmit a command to cause an actuator of the robotic arm 218 (e.g., an actuator linking the members 220B and 220C) to move member 220C at each of various angular velocities. Accordingly, the processor 302 may determine which of these angular velocities the robotic arm 218 is able to achieve (e.g., in one or both directions of movement) and which of these angular velocities the robotic arm 218 is unable to achieve. And the processor 302 may then record the maximum angular velocity that the robotic arm 218 is able to achieve or perhaps a range of velocities that the robotic arm 218 is able to achieve, among other options. Other examples are possible as well.

In another example implementation, the processor 302 of the robot part 300 may use the particular movements as a basis for determining movement capabilities of the robot part 300, such as movement capabilities that are in effect when the robot part 300 is connected to the robotic system 200. To do so, the processor 302 may evaluate and record information in response to the particular movements. This information may include (without limitations): spatial positions that the robot part 300 achieves during the particular movements, velocities at which the robot part 300 was able to move during the particular movements, and/or accelerations at which the robot part 300 was able to move during the particular movements, among other possibilities.

More specifically, the command may cause the robotic system 200 to move each of one or more moveable components 216 to each of a plurality of spatial positions. When the robotic system 200 carries out such movements, the processor 302 may determine and record joint angles of the robotic system 200. For instance, the processor 302 may record a set of joint angles that the robotic system 200 exhibits at particular time and may then record a different set of joint angles that the robotic system 200 exhibits at a different time. For each such set of joint angles, the processor 302 may determine a corresponding spatial position of the robot part 300 when the robotic system 200 exhibits a given set of joint angles. This spatial position may be defined as a physical location of the robot part 300 relative to a physical location of a certain component of the robotic system 200 and/or may be defined as a physical orientation of the robot part 300 relative to a physical orientation of a certain component of the robotic system 200, among other possibilities.

By way of example, referring back to FIGS. 8A to 8B, the joint angle between members 220B and 220C is at angle $\gamma$ when the robotic arm 218 is positioned at position 800. As such, the robotic arm 218 exhibits a set of joint angles $\alpha$ and $\gamma$ when the robotic arm 218 is positioned at position 800. And when the robotic arm 218 exhibits the set of joint angles $\alpha$ and $\gamma$, the robot part 320 may be at the physical location shown in FIG. 8A and may be positioned at the physical orientation 804. On the other hand, the joint angle between members 220B and 220C is at angle $\delta$ when the robotic arm 218 is positioned at position 802. As such, the robotic arm 218 exhibits a set of joint angles $\beta$ and $\delta$ when the robotic arm 218 is positioned at position 802. When the robotic arm 218 exhibits the set of joint angles $\beta$ and $\delta$, the robot part 320 may be at the physical location shown in FIG. 8B and may be positioned at the physical orientation 806. Other examples are possible as well.

Further, when the robotic system 200 carries out the above-mentioned movements, the robotic system 200 may move from (i) exhibiting a first set of joint angles and the robot part 300 thus having a first corresponding spatial position to (ii) exhibiting a second set of joint angles and the robot part 300 thus having a second corresponding spatial position. In doing so, the robotic system 200 may move the moveable components 216 through a certain combination of spatial movements in order to arrive at the second set of joint angles or may move the moveable components 216 through other combinations of spatial movements in order to arrive at the second set of joint angles. Moreover, the robotic system 200 may move the moveable components 216 through such combinations at various velocities and at various accelerations. As such, when the robotic system 200 moves through each such combinations at each velocity/acceleration, the processor 302 may record a velocity and/or an acceleration at which the robot part 300 moved from the first corresponding spatial position to the second corresponding spatial position. In this manner, the processor 302 can also determine the velocity and/or acceleration capabilities of the robot part 300 that are in effect when the robot part 300 is connected to the robotic system 200. Also, note that determination of these kinematic models may also extend to other example robots, such as to legged robot for instance.

In another aspect, once above-mentioned movement capabilities (e.g., of the robotic system 200 and/or of the robot part 300) have been determined, the processor 302 may store these capabilities. This may specifically involve storing the kinematic model, among other possibilities. Moreover, the processor 302 may store these capabilities in the data storage 304 of the robot part 300 and/or in the data storage 204 of the robotic system 200. Additionally or alternatively, the processor 302 may transmit these capabilities for storage on the cloud 102.

When the capabilities are stored on the cloud 102, these capabilities can be obtained by various entities at a later point in time. As an example, the processor 302 may determine that the robot part 300 disconnected from the robotic system 200. And at a later point in time, the processor 302 may determine that the robot part 300 reconnected to the robotic system 200 (or to another robotic system of the same type, model, manufacturer etc.). Once the processor 302 determines that the robot part 300 reconnected to the robotic system 200, the processor 302 may transmit to the cloud 102 a query requesting information related to the capabilities. Responsively, the cloud 102 may then transmit the requested information to the processor 302.

In another example, a different robot part may connect to the robotic system 200 (or to another robotic system of the same type, model, manufacturer etc.) and may transmit to the cloud 102 a query requesting information related to the capabilities. And in response to this query, the cloud 102 may then transmit the requested information to the different robot part. In this manner, once capabilities of the robotic system 200 have been determined, these capabilities may be shared among a plurality of robot parts, such as those disclosed herein.

VII. Object Manipulation

In an example implementation, the robot part 300 may be configured to grasp onto and/or move objects while the robot part 300 is connected to the robotic system 200. In particular, the processor 302 of the robot part 300 may determine an approach for grasping an object and perhaps an approach for moving the object once the object has been grasped. To do so, the processor 302 may take into account the above-mentioned environment information, identification information, determined capabilities of the robotic system 200, and/or determined capabilities of the robot part 300, among other possibilities.

In this implementation, when determining an approach for manipulating an object, the processor 302 may use environment information that is based on sensor data received from sensors 310 of the robot part 300 and perhaps may also use environment information that is based on sensor data received from sensors 210 of the robotic system 200. In some cases, such sensor data from sensors 310 of the robot part 300 may provide environment information that sensor data from sensors 210 of the robotic system 200 could not. For example, the robot part 300 may include some sensors 210 that are not included in the robotic system 200. And in another example, the object may sometimes be occluded to the sensors 210 of the robotic system 200 such that the sensors 210 cannot receive data related to the object. And while these sensors 210 of the robotic system 200 cannot receive data related to the object, the object may not be occluded to the sensors 310 of the robot part 300 and the sensors 310 could thus receive this data related to the object. In this manner, the robot part 300 provides additional sensing capabilities that may ultimately be used as a basis to determine an approach for manipulating an object.

When determining or otherwise carrying out an approach for manipulating an object, the processor 302 may transmit commands to the robotic system 200 to cause the robotic system 200 to carry out tasks that would ultimately allow the robot part 300 to appropriately grasp onto the object. For example, the processor 302 may transmit one or more commands to cause the robotic system 200 to move the robot part 300 to a spatial location that is in the vicinity (e.g., within a threshold distance) of the object. Once the processor 302 determines (e.g., based on sensor data from sensor(s) 310) that the robotic system 200 has moved the robot part 300 to a spatial location at which the robot part 300 is capable of grasping onto the object, the processor 302 may then cause the robot part 300 to grasp onto the object. For instance, the processor 302 may transmit a command to the end effector arrangement 318 to carry out a mechanical action to grasp onto the object. By way of example, if the arrangement 318 includes a suction gripper, then this command may cause the suction gripper to apply a suction force so as to grasp onto the object.

Further, when the robotic system 200 moves the robot part 300 towards a spatial location that is in the vicinity of the object, the processor 302 may determine an approach for grasping onto the object based on environment information. For instance, the processor 302 may determine timing for grasping onto the object based on environment information. For example, the processor 302 may determine this timing based on information related to moving obstacles in the environment, so as to avoid collision with such moving obstacles. In another instance, the processor 302 may determine a specific alignment of the robot part 300 at which the robot part 300 is capable of grasping onto the object. For example, the end effector arrangement 318 may include a finger gripper and the processor 302 may determine characteristics of the object, such as by determining that the object includes a cylindrical surface for instance. In this example, if the processor 302 determines that the robot part 302 should grasp onto the cylindrical surface, then the processor 302 may direct the robotic system 200 to rotate the robot part 300 such that the finger gripper is aligned to grasp onto the cylindrical surface of the object. Other examples are possible as well.

In some cases, the processor 202 of the robotic system 200 may determine an approach for grasping onto the object, such as by determining a set of operations that the robotic system 200 and/or the robot part 300 should carry out. And the processor 302 of the robot part 300 may then "fine tune" that approach. For instance, this may involve the processor 302 determining certain operation(s) to use as part of the approach instead of certain operation(s) determined by processor 202, the processor 302 removing from the approach certain operation(s) determined by processor 202, and/or the processor 302 adding to the approach certain operation(s) in addition to the operation(s) determined by processor 202, among other possibilities.

By way of example, the processor 202 may use sensor data from sensors 210 of the robotic system 200 to determine that the object includes a first portion that is at a first distance away from the robot part 300 and that the robot part 300 should grasp onto the first portion. But the processor 302 may use sensor data from sensors 310 of the robot part 300 to determine that the object includes a second portion, which may be occluded to sensors 210 of the robotic system 200. Moreover, the processor 302 may determine that this second portion is at a second distance away from the robot part 300, which may be smaller than the first distance and thus closer to the robot part 300. As such, the processor 302 may responsively direct the robotic system 200 to instead take actions to cause the robot part 300 to grasp onto the second portion. Other examples are possible as well.

In another aspect, the processor 302 of the robot part 300 may also determine an approach for moving an object that the robot part 300 has grasped onto. The processor 302 may determine this approach before the robot part 300 grasps onto the object, once the robot part 300 grasps onto the object, and/or may when the robotic system 200 and the robot part 300 are in the process of collectively moving the object, among other possibilities. In any case, determining the approach may involve determining a path for moving the object based on environment information, based on capabilities of the robotic system 200, and/or based on capabilities of the robot part 300. For example, the processor 302 may determine a path that results in a sequence of joint angles that the robotic system 200 is capable of carrying out. In another example, the processor 302 may determine a path that results in a sequence of spatial positions at which the robot part 300 can be placed when connected to the robotic system 200. And in yet another example, the processor 302 may use the environment information to determine a path that causes the robotic system 200, the robot part 300, and the grasped object to each avoid obstacles in the environment.

In another instance, determining the approach may involve determining an approach for setting the object at a drop-off location. For instance, the processor 302 may use sensor data from sensors 310 of the robot part 300 to determine a set of operation to set the object at the drop-off location. By way of example, the processor 302 may use sensor data to determine a flat portion of the drop-off location and to determine a flat portion of the object. In this example, the processor 302 may then generate a command to position the flat portion of the object parallel to the flat portion of the drop-off location. And the processor 302 may then generate a command to cause the robotic system 200 to lower the object to the drop-off location while maintaining the parallelism of the flat portions at issue. In this manner, the processor 302 can generate commands to ensure safety of the object when setting the object at a drop-off location. Other examples are possible as well.

In yet another aspect, the processor 302 may communicate with the cloud 102 when determining an approach for manipulating an object. In particular, any of the processing approaches discussed above may instead be carried out in the cloud 102, such as upon request by the processor 302 for instance. By way of example, the cloud 102 may identify the object as well as an approach for grasping onto the object. This approach may be an approach stored in the cloud 102 that was previously used by the robot part 300 to grasp onto the object or was previously used by a different robot part to grasp onto the object, among other possibilities. In either case, the processor 302 may obtain this approach from the cloud 102 and may then use this approach to grasp onto the object. In this manner, various robot parts 300 can share via the cloud 102 approaches for grasping onto a particular object.

Figure 9:
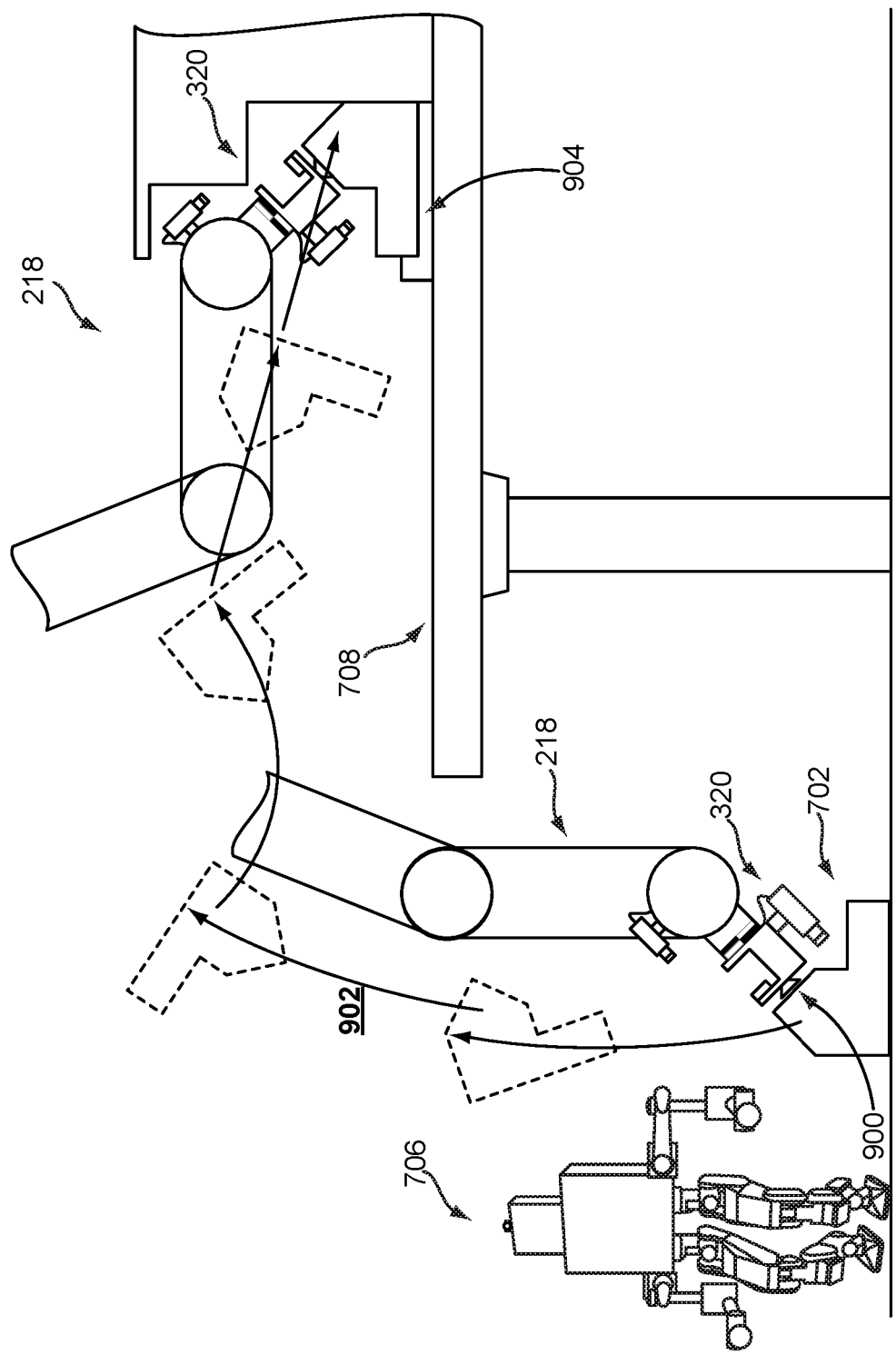
FIG. 9 illustrates object manipulation carried out by the robot part, according to an example implementation.

FIG. 9 next illustrates an example of object manipulation that is carried out by the combination of the robotic arm 218 and the example robot part 320. As shown, the processor of the example robot part 320 directs the robotic arm 218 to move the robot part 320 towards a particular portion 900 of the object 702. And once the robotic arm 218 moves the robot part 320 towards the particular portion 900 of the object 702, the processor of the robot part 320 may direct the gripper 326 of the robot part 320 to grasp onto the object. Then, the processor of the robot part 320 may determine a path 902 to move the object 702 to a drop-off location 904 on the platform 708. As shown, this path 902 is arranged to avoid collision of the object 702 with the humanoid robot 706 as well as to avoid collision of the object 702 with the platform 708. As such, once the processor of the robot part 320 determines the path 902, the processor of the robot part 320 may generate commands to cause the robot arm 218 to move the object 702 to the drop-off location 904. Moreover, while the robot arm 218 moves the object 702 to the drop-off location 904, the robot part 320 may determine adjustment to the path 902, such as due to changes to the environment for instance. Other examples are possible as well.

VIII. Additional Aspects

Figure 10:
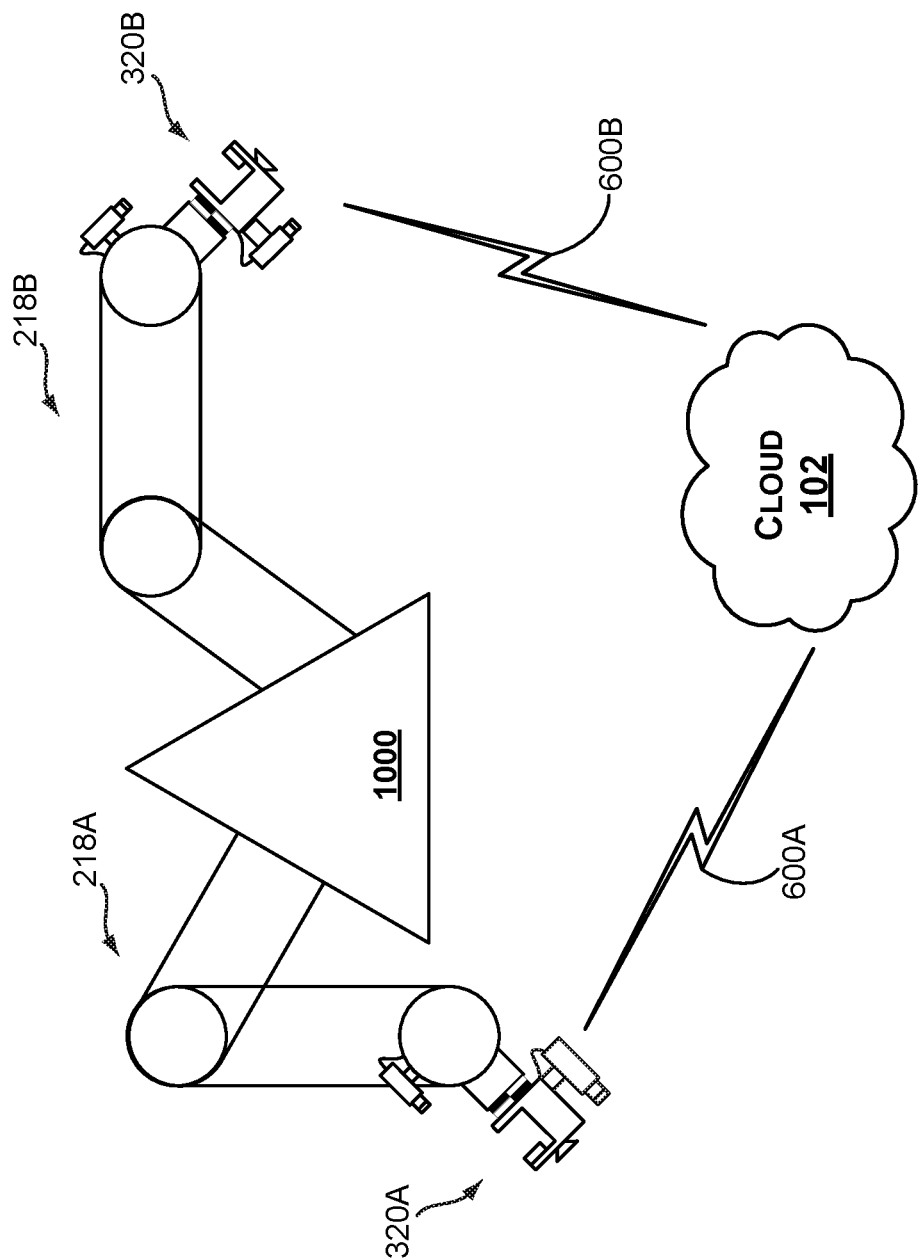
FIG. 10 illustrates a robot system including first and second robotic arms each connected to a robot part, according to an example implementation.

In a further aspect, two or more robot parts may each connect to the same robotic system and may communicate with each other via the cloud 102 while so connected. For example, FIG. 10 illustrates a robot system 1000 including a first robotic arm 218A as well as a second robotic arm 218B. Also, the first robotic arm 218A is connected to a first example robot part 320A that can engage in communications with the cloud 102 via a communication link 600A. The second robotic arm 218B is connected to a second example robot part 320B that can engage in communications with the cloud 102 via a communication link 600B. With this arrangement, the first robot part 320A may determine that the second robot part 320B is connected to the same robotic system 1000 (e.g., based on an encoded signal received from the robotic system 1000 or via the cloud 102) and may then transmit data, via the cloud 102, to the second robot part 320B and/or may receive data, via the cloud 102, from the second robot part 320B. Additionally or alternatively, the first robot part 320A and the second robot part 320B may communicate with each other more directly, such as through the robotic system 1000 and/or through a wireless communication link for instance.

When two or more robot parts are each connected to the same robotic system and communicate with each other via the cloud 102, these robots parts may transmit data to each other for various reasons. For example, the robot parts may share sensor data with each other via cloud. In this way, a given robot part may obtain sensor data received by sensors of each other robot part and may thus generate commands based on evaluation of sensor data from all robot parts connected to the robotic system at issue rather than based only on evaluation of sensor data received from sensors of the given robot part. In another example, a given robot part may transmit via the cloud 102 commands to cause another robot part to carry out various operations. Moreover, such cloud 102 communications may be faster and more efficient than other options. Other examples are also possible.

Figure 11B:
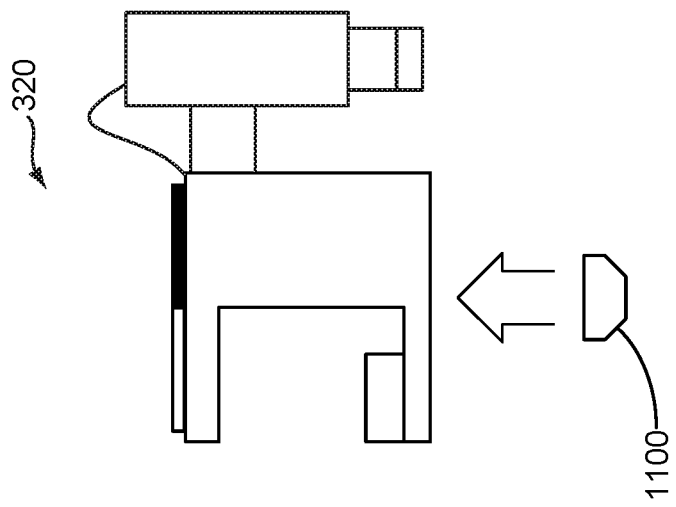
FIGS. 11A and 11B illustrate a robot part capable of connecting to multiple end effectors, according to an example implementation.
Figure 11A:
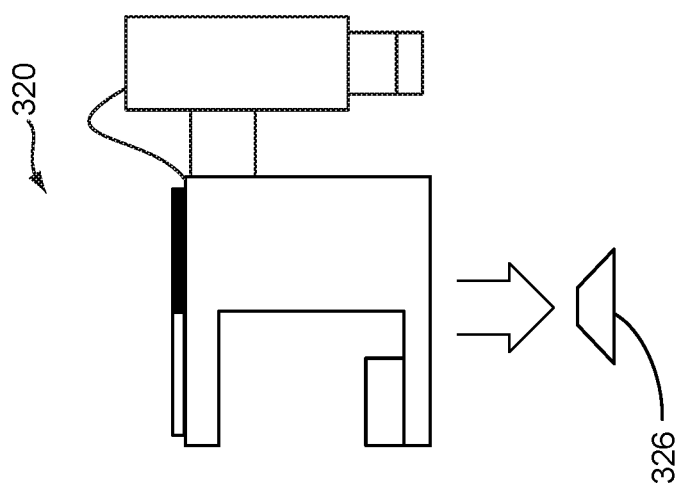

In yet a further aspect, the robot part 300 disclosed herein may be configured to connect to various end effectors. As noted, the end effector arrangement 318 may provide for electrical and mechanical connectivity to a plurality of external end effectors, such as grippers and/or tools, among other possibilities. For example, FIGS. 11A to 11B illustrate such adaptability to multiple end effectors. In particular, FIG. 11A shows the gripper 326 being disconnected from the example robot part 320. Whereas, FIG. 11B shows an example drill chuck 1100 being connected to the example robot part 320. This drill chuck 1100 could then couple to various drill bits.

With this arrangement, the processor 302 may determine that the robot part 300 is coupled to a particular end effector from among the plurality of end effectors. In response to determining that the robot part 300 is coupled to a particular end effector from among the plurality of end effectors, the processor 302 may then identify the particular end effector. For example, the processor 302 may refer to data storage 304 and/or to the cloud 102 to obtain identification information to identify the particular end effector. This identification information may specify (without limitation): a model number of the particular end effector, a type of the particular end effector, a manufacturer of the particular end effector, technical specifications of the particular end effector, protocols (e.g., communication protocols) used by the particular end effector, and/or capability information of the particular end effector, among others. In this manner, the robot part 300 disclosed herein may connect to various robotic systems and may be used for various purposes when connected to such robotic systems. Other aspects are possible as well.

IX. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robot part comprising:
an interface providing wireless connectivity;
a sensor;
one or more processors;
a non-transitory computer readable medium; and
program instructions stored on the non-transitory computer readable medium and executable by the one or more processors to:
   while the robot part is removably connected to a particular robotic system of a robot, the particular robotic system comprising (i) one or more appendages and (ii) one or more actuators each coupled to at least one of the one or more appendages:
      transmit, to an external computing system via the interface, sensor data that the one or more processors received from the sensor, the sensor data comprising image data of an environment in which the particular robotic system is operating; and
      receive, from the external computing system via the interface, environment information based on interpretation of the sensor data, the environment information comprising identification of an object and a location of the identified object in the environment;
   based on the environment information, generate a command specifying a task for the robot part of the particular robotic system of the robot; and
   transmit the command to the particular robotic system, the command when received by the particular robotic system causing the particular robotic system to move the robot part to a spatial location relative to the location of the identified object in the environment, and
   wherein the command that causes the particular robotic system to move the robot part causes the one or more actuators to move each of the one or more appendages to each of a plurality of spatial positions.

2. The robot part of claim 1, wherein the program instructions are further executable to determine movement capabilities of the particular robotic system based on the command specifying the task.

3. The robot part of claim 2, wherein the program instructions are further executable to transmit, to the external computing system, the determined movement capabilities of the particular robotic system.

4. The robot part of claim 3, wherein the program instructions are further executable to:
   determine that the robot part is disconnected from the particular robotic system;
   after the robot part is disconnected from the particular robotic system, determine that the robot part is reconnected to the particular robotic system; and
   in response to determining that the robot part is reconnected to the particular robotic system, obtain, from the external computing system, capability information representative of the determined movement capabilities of the particular robotic system.

5. The robot part of claim 2, wherein determining the movement capabilities of the particular robotic system comprises determining a kinematic model of the particular robotic system.

6. The robot part of claim 5, wherein the kinematic model of the particular robotic system is representative of one or more of: (i) joint angle capabilities of the particular robotic system; (ii) velocity capabilities of the particular robotic system; or (iii) acceleration capabilities of the particular robotic system.

7. The robot part of claim 5, wherein:
   determining the kinematic model comprises, based on movement of each of the one or more appendages to each of the plurality of spatial positions, determining one or more of: (i) a range of motion of each of the one or more appendages; or (ii) degrees of freedom through which the particular robotic system is capable of moving the one or more appendages.

8. The robot part of claim 7, wherein the command further causes the one or more actuators to move each of the one or more appendages to each of the plurality of spatial positions at each of a plurality of velocities, and wherein determining the kinematic model further comprises, based on movement of each of the one or more appendages to each of the plurality of spatial positions at each of the plurality of velocities, determining velocities at which the particular robotic system is capable of moving the one or more appendages.

9. The robot part of claim 7, wherein the command further causes the one or more actuators to move each of the one or more appendages to each of the plurality of spatial positions at each of a plurality of accelerations, and wherein determining the kinematic model further comprises, based on movement of each of the one or more appendages to each of the plurality of spatial positions at each of the plurality of accelerations, determining accelerations at which the particular robotic system is capable of moving the one or more appendages.

10. The robot part of claim 2, wherein the program instructions are further executable to
   based on the determined movement capabilities of the particular robotic system, determine movement capabilities of the robot part, wherein the determined movement capabilities of the robot part are in effect when the robot part is removably connected to the particular robotic system; and
   transmit, to the external computing system, the determined movement capabilities of the robot part.

11. The robot part of claim 10, wherein determining movement capabilities of the robot part comprises determining a kinematic model of the robot part in combination with the particular robotic system.

12. The robot part of claim 11, wherein the kinematic model of the robot part in combination with the particular robotic system is representative of one or more of:
   (i) spatial positioning capabilities of the robot part when the robot part is removably connected to the particular robotic system;
   (ii) velocity capabilities of the robot part when the robot part is removably connected to the particular robotic system; or
   (iii) acceleration capabilities of the robot part when the robot part is removably connected to the particular robotic system.

13. The robot part of claim 10, wherein determining movement capabilities of the particular robotic system comprises determining joint angle capabilities of the particular robotic system, wherein determining movement capabilities of the robot part comprises, based on the determined joint angle capabilities of the particular robotic system, determining spatial positioning capabilities of the robot part, and wherein the spatial positioning capabilities of the robot part are in effect when the robot part is removably connected to the particular robotic system.

14. The robot part of claim 10, wherein determining movement capabilities of the particular robotic system comprises determining velocity capabilities of the particular robotic system, wherein determining movement capabilities of the robot part comprises, based on the determined velocity capabilities of the particular robotic system, determining velocity capabilities of the robot part, and wherein the velocity capabilities of the robot part are in effect when the robot part is removably connected to the particular robotic system.

15. The robot part of claim 10, wherein determining movement capabilities of the particular robotic system comprises determining acceleration capabilities of the particular robotic system, wherein determining movement capabilities of the robot part comprises, based on the determined acceleration capabilities of the particular robotic system, determining acceleration capabilities of the robot part, and wherein the acceleration capabilities of the robot part are in effect when the robot part is removably connected to the particular robotic system.

16. The robot part of claim 1, wherein the robot part is a first robot part, and wherein the program instructions are further executable to:
  determine that a second robot part is also removably connected to the particular robotic system, wherein the second robot part also comprises (i) one or more processors, (ii) a sensor, and (iii) an interface providing wireless connectivity; and
  in response to determining that the second robot part is also removably connected to the particular robotic system, engage in communications with the second robot part via the at least one external computing system.

17. The robot part of claim 1, wherein the robot part is configured to couple to each of a plurality of end effectors, and wherein the program instructions are further executable to:
  determine that the robot part is coupled to a particular end effector of the plurality of end effectors; and
  in response to determining that the robot part is coupled to the particular end effector, identify the particular end effector, wherein the command also causes the particular end effector to carry out the task.

18. The robot part of claim 17, wherein identifying the particular end effector comprises obtaining, from the external computing system, end effector identification information to identify the particular end effector.

19. A method comprising:
  while a robot part is removably connected to a particular robotic system of a robot, the particular robotic system comprising (i) one or more appendages and (ii) one or more actuators each coupled to at least one of the one or more appendages:
    transmitting, by one or more processors of the robot part to an external computing system via an interface of the robot part, sensor data that the one or more processors received from a sensor of the robot part, the sensor data comprising image data of an environment in which the particular robotic system is operating; and
    receiving, by the one or more processors from the external computing system via the interface, environment information based on interpretation of the sensor data, the environment information comprising identification of an object and a location of the identified object in the environment;
  based at least in part on the environment information, generating, by the one or more processors, a command specifying a task for the robot part of the particular robotic system of the robot; and
  transmitting, by the one or more processors, the command to the particular robotic system, the command when received by the particular robotic system causing the particular robotic system to move the robot part to a spatial location relative to the location of the identified object in the environment, and
  wherein the command that causes the particular robotic system to move the robot part causes the one or more actuators to move each of the one or more appendages to each of a plurality of spatial positions.

* * * * *